(12) United States Patent
Scobey, Jr.

(10) Patent No.: US 8,720,834 B2
(45) Date of Patent: *May 13, 2014

(54) BAG SUPPORT AND HOLDING DEVICE

(76) Inventor: Fred Bradley Scobey, Jr., Valley Glen, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,371

(22) Filed: Jul. 2, 2012

(65) Prior Publication Data

US 2013/0221694 A1 Aug. 29, 2013

Related U.S. Application Data

(63) Continuation-in-part of application No. 12/723,599, filed on Mar. 12, 2010, now Pat. No. 8,210,485.

(60) Provisional application No. 61/159,794, filed on Mar. 12, 2009.

(51) Int. Cl.
  *B65B 67/04* (2006.01)
(52) U.S. Cl.
  USPC .................................. 248/99; 248/97; 248/907
(58) Field of Classification Search
  USPC .................. 248/95, 97, 99, 101, 907; 186/66; 24/21, 22, 30.5 R, 30.5 P, 30.5 S, 33 L, 24/33 A
  See application file for complete search history.

(56) References Cited

U.S. PATENT DOCUMENTS

| | | | | |
|---|---|---|---|---|
| 212,033 A * | 2/1879 | McNeely | ............................ | 24/22 |
| 1,121,388 A * | 12/1914 | Milks | .............................. | 248/95 |
| 1,351,772 A * | 9/1920 | Libbey | .............................. | 24/483 |
| 1,502,597 A * | 7/1924 | Taylor | .............................. | 248/97 |
| 1,849,784 A * | 3/1932 | Birch et al. | ......................... | 24/21 |
| 3,532,314 A * | 10/1970 | Vosbikian | ......................... | 248/97 |
| 4,037,778 A * | 7/1977 | Boyle | ............................ | 141/390 |
| 4,319,726 A * | 3/1982 | Andersson | ......................... | 248/97 |
| 4,846,427 A * | 7/1989 | Jones | .............................. | 248/95 |
| 5,139,219 A * | 8/1992 | Navarro | .......................... | 248/97 |
| 5,433,406 A * | 7/1995 | Chavez | ........................... | 248/99 |
| 5,588,622 A * | 12/1996 | Gordon, Sr. | .................. | 248/101 |
| 5,899,419 A * | 5/1999 | Ross et al. | ...................... | 248/97 |
| 6,030,010 A * | 2/2000 | Graeff | ............................ | 294/214 |
| 6,367,822 B1 * | 4/2002 | Hutchins | ..................... | 280/47.24 |
| 6,494,619 B1 * | 12/2002 | Sulpizio | ......................... | 383/33 |
| 6,543,732 B1 * | 4/2003 | Yuan | ................................ | 248/99 |
| 6,648,386 B2 * | 11/2003 | Rheinhardt | .................... | 294/214 |
| 6,676,092 B2 * | 1/2004 | Tsai | ................................ | 248/97 |
| 7,066,220 B1 * | 6/2006 | Take et al. | ....................... | 141/391 |
| 7,350,547 B2 * | 4/2008 | Quiring | ........................... | 141/391 |
| 7,461,821 B2 * | 12/2008 | Cheng | .............................. | 248/99 |
| 7,753,322 B1 * | 7/2010 | Peterson | ......................... | 248/99 |
| 2009/0014603 A1 * | 1/2009 | Zima | ............................... | 248/101 |

* cited by examiner

*Primary Examiner* — Bradley Duckworth
(74) *Attorney, Agent, or Firm* — Colin P. Abrahams

(57) ABSTRACT

A hoop for holding a bag comprises a hoop strip having a first end, a second end and a central portion between the first and second ends. The hoop strip being comprises a resilient material. A first loop member attaches to the first end of the hoop strip, defining a channel which receives slidably therein the central portion of the hoop strip. A second loop member attaches to the second end of the hoop strip, defining a channel which receives slidably therein the central portion of the loop strip. The first and second loop members keep the hoop strip generally circular, but it can be adjusted so as to have a plurality of circumferences by sliding the central portion of the hoop strip within the first and second loop members. The hoop may also comprise a handle for holding the hoop, and a base.

27 Claims, 11 Drawing Sheets

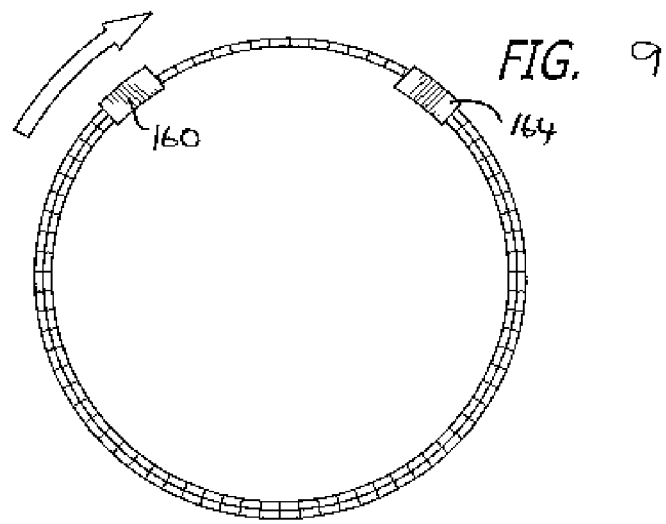
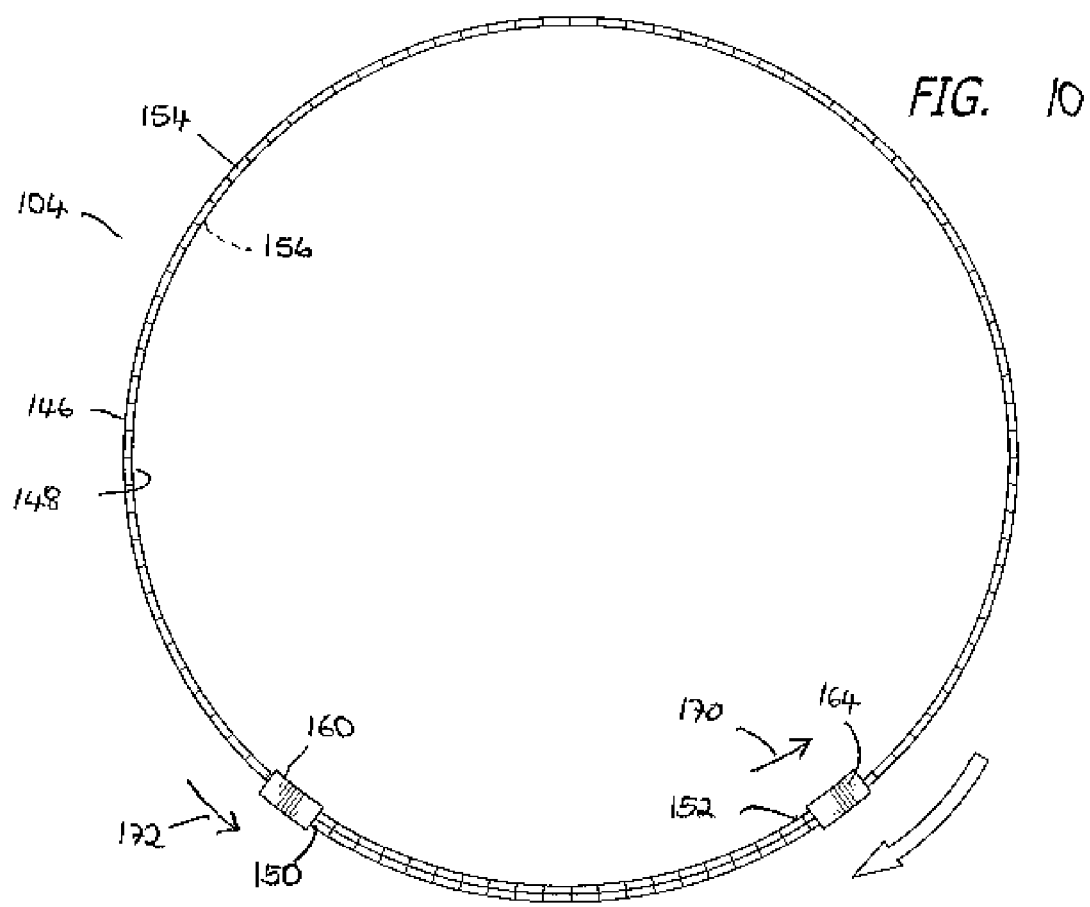

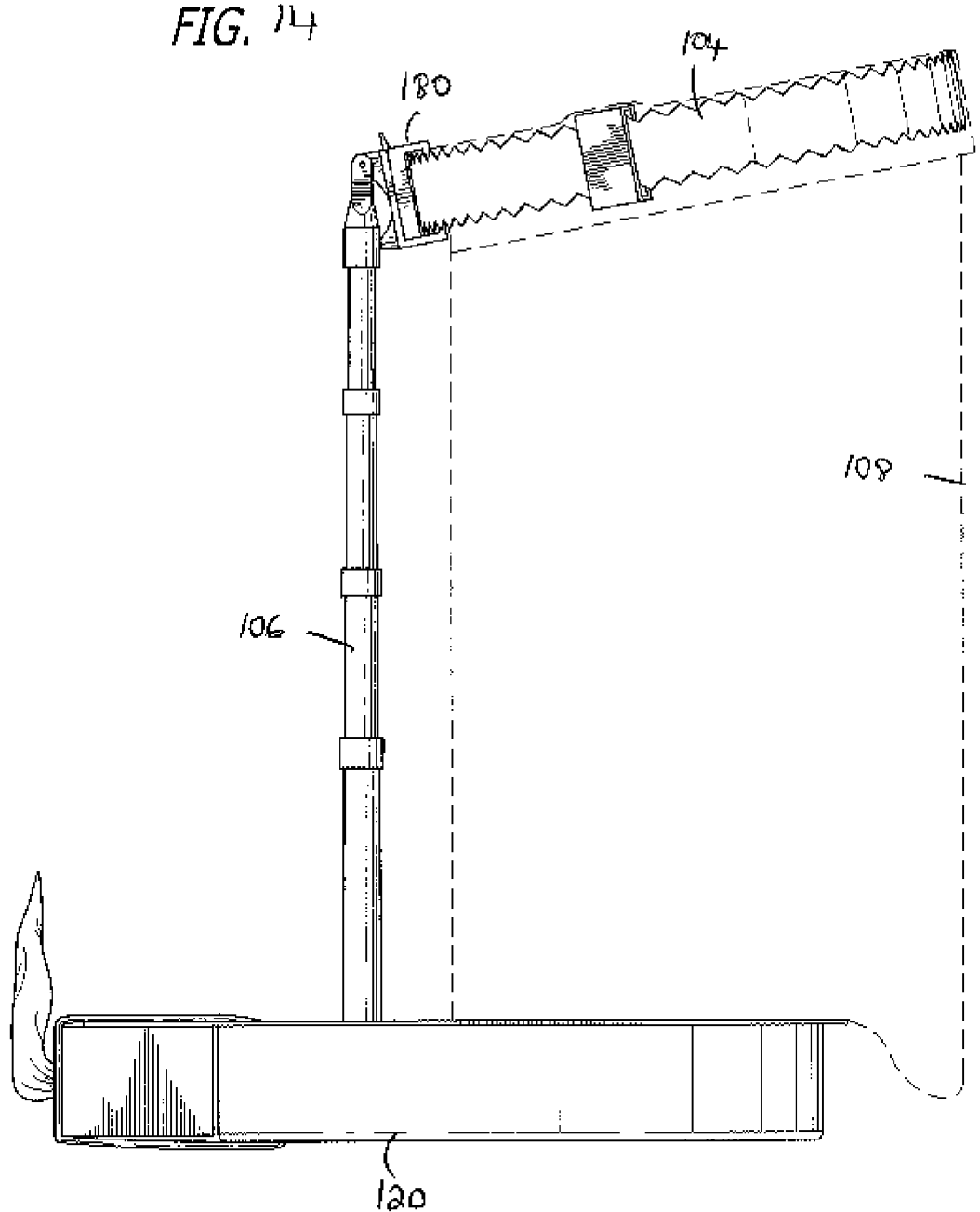

BAG SUPPORT AND HOLDING DEVICE

CROSS-REFERENCES TO RELATED APPLICATIONS

This application is a continuation in part application of U.S. patent application Ser. No. 12/723,599 filed Mar. 12, 2010, issued as U.S. Pat. No. 8,210,485 on Jul. 3, 2012, which claims the benefit U.S. Provisional Patent Application No. 61/159,794 filed on Mar. 12, 2009, and the contents of both are incorporated herein by reference in their entireties.

FIELD AND BACKGROUND OF THE INVENTION

The present invention relates to a bag support and holding device. A device in accordance with the invention may be used to hold open a bag, such as a plastic trash bag, in various orientations to permit the depositing of materials into the bag under a wide variety of circumstances.

During yard maintenance, especially by a homeowner of a residential property, the use of trash bags in the collecting of material, such as leaves, refuse, debris, discarded items, and the like from the yard area, can be challenging especially when an individual generally tries to hold open the trash bag while simultaneously operating cleaning implements such as a rake, broom, and the like, to try to load the trash bag with the material collected from the yard. It is often awkward or difficult to keep the open mouth end of a trash bag open, sometimes a two-handed operation under the best of circumstances, while simultaneously operating an implement and collecting material or refuse to place in the bag.

The same difficulties arise in other environments as well where bags need to be held open to receive materials. Examples can include: trash or plastic bags used to hold recyclables; bags for receiving clothes to wash, soiled linen, and the like; and trash bags under a sink used to hold kitchen garbage.

SUMMARY OF THE INVENTION

According to one aspect of the invention, there is provided a hoop for holding a bag, the hoop comprising: a hoop strip having a first end, a second end and a central portion between the first end and the second end, the hoop strip being comprised of a resilient material and having an inside surface, an outside surface, an upper edge and a lower edge; a first loop member attached to the first end of the hoop strip, the first loop member defining a channel which receives slidably therein the central portion of the hoop strip; a second loop member attached to the second end of the hoop strip, the second loop member defining a channel which receives slidably therein the central portion of the loop strip, the first and second loop members maintaining the hoop strip in a generally circular rest configuration; and wherein the generally circular configuration of the hoop strip can be adjusted so as to have a plurality of circumferences by sliding the central portion of the hoop strip within the first loop member and second loop member.

According to another aspect of the invention, there is provided a method of bagging debris comprising: forming a hoop of generally circular rest configuration for holding a bag, the hoop having a hoop strip with a first end and a first loop, a second end and a second loop, and a central portion between the first end and the second end, the hoop strip being comprised of a resilient material and having an inside surface, an outside surface, an upper edge and a lower edge; adjusting the generally circular configuration of the hoop strip so as to have a selected one of a plurality of circumferences by sliding the central portion of the hoop strip within the first loop member and second loop member; placing a plastic bag with a body portion and an edge portion defining an open mouth on the hoop, the body portion of the bag being placed inside of the hoop against the inside surface thereof, and the edge portion being folded over the upper edge of the hoop and against the outer surface thereof.

According to one aspect of the invention, there is therefore provided a bag support and holding device which is able to receive and hold in a releasable manner a bag so that the bag is at least partially open, or fully open. Preferably, the bag is positioned so to receive material or objects which are to be deposited therein, such as debris, household goods and the like. The bag may be a plastic trash bag, but any other type of bag may be used with the invention. Any reference in this specification to a trash bag or a plastic bag should be considered to include a bag of any type, to receive a wide variety of material or objects.

The bag support and holding device may be used to orient the trash bag to generally place the open mouth of the trash bag in a preferred selected position, such as proximate to the ground to facilitate the entry of materials like swept leaves or garden refuse from the adjacent ground into the trash bag. The bag may optionally be positioned by the bag holder and support device so as to suspend the bag with its open mouth facing upward to conveniently receive materials which are dropped into it. These materials may in fact assist in keeping, or keep, the bag generally upright. A base support or stand may be provided, with a small footprint in one embodiment, to receive the bag holder when in an operational position, or to store the bag holder when not in use.

In one embodiment, the bag holder has the ability to hold open the mouth of a trash bag in a generally vertical or horizontal orientation, or anything inbetween, to allow the operator to place materials into the trash bag.

A hoop may be provided which has an adjustable diameter and edges that can securely but releasably attach to a trash bag to hold the trash bag open. The bag holder can preferably accommodate a wide variety of trash bags of different sizes and lengths. The bag holder may also be placed into a compact state with a comparatively small footprint for ease of storage.

One aspect of the invention is for bag holder comprising a strip of resilient material, having length and width, terminating in two strip ends. One strip end may be looped relative to the other end to adjustably form a hoop of desired circumference. A catch mechanism may releasably maintain the hoop at the desired circumference, and a handle with two handle ends may be provided, a first handle end being pivotally attached to at least a portion of the hoop. The hoop may retain and hold open an open-mouth portion of a plastic bag placed upon the hoop by adjusting the desired circumference of the hoop to at least meet the circumference of the open-mouth portion of the bag.

According to another aspect of the invention, there is provided a method of operating a bag holder, comprising: providing a bag holder having a hoop with an adjustable desired circumference, the hoop pivotally connected to one end of a two-ended handle; providing a bag with an open-mouth portion; placing the open-mouth portion over the hoop; and adjusting the circumference of the hoop to retain the bag.

BRIEF DESCRIPTION OF THE DRAWINGS

In the drawings:

FIG. 9 is a top view of the bag holder hoop of the present invention in a reduced diameter configuration;

FIG. 10 is a top view of the bag holder hoop of the present invention in an expanded diameter configuration;

FIG. 14 is a side view of the bag holder hoop, handle and base in accordance with the present invention.

DETAILED DESCRIPTION OF THE INVENTION

Figure 1:
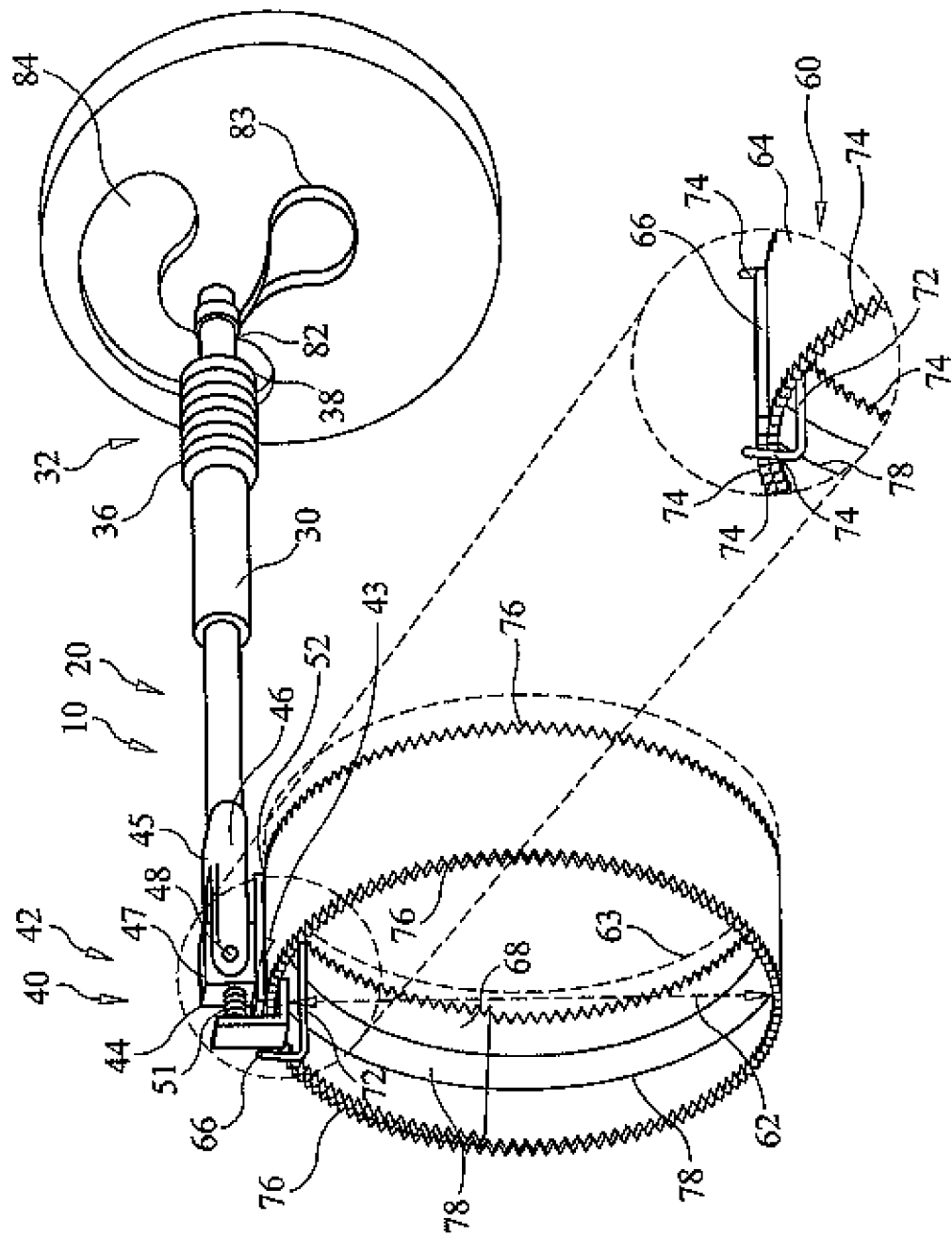
FIG. 1 is a perspective view of one embodiment of the present invention.
Figure 2:
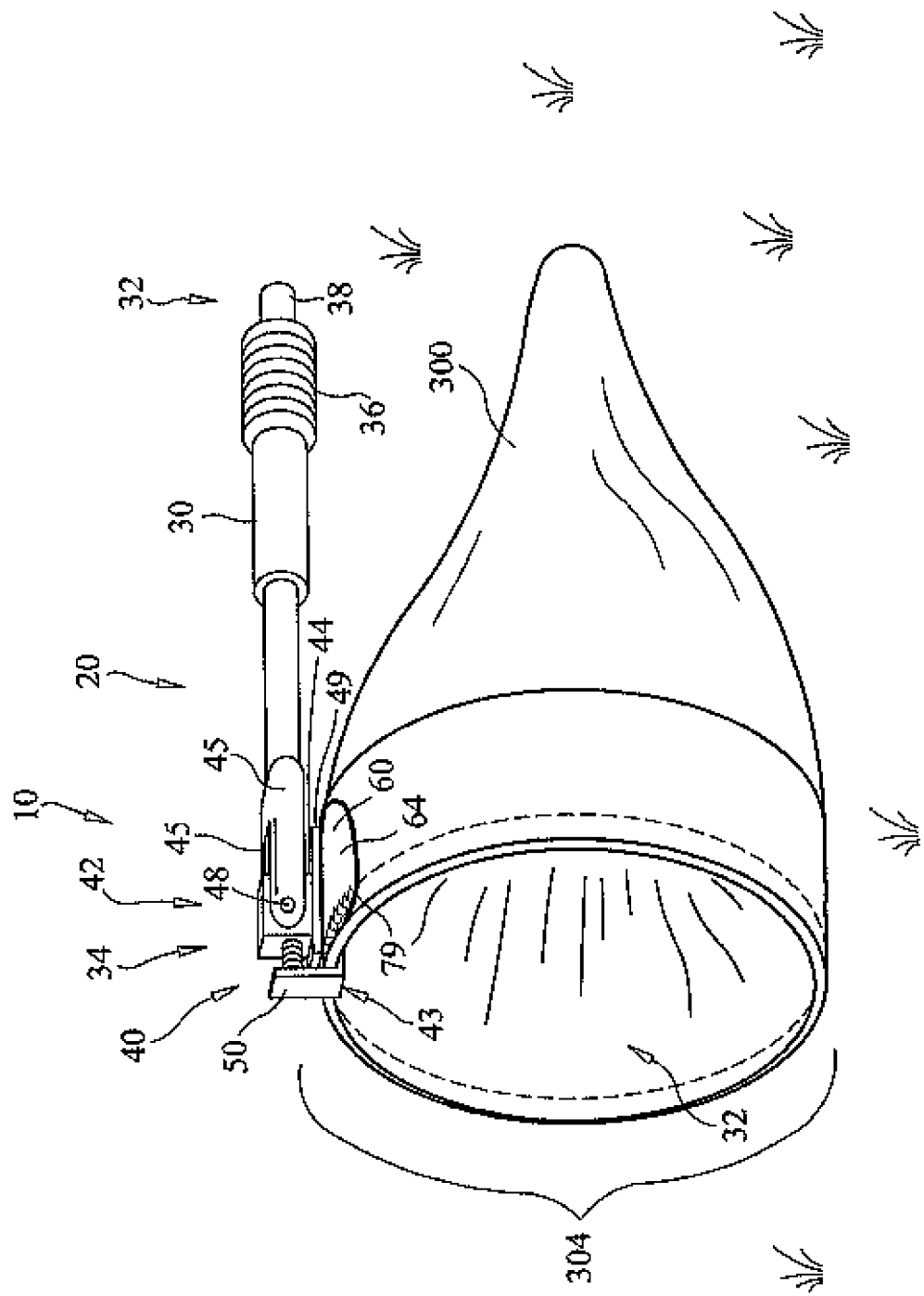
FIG. 2 is a perspective view of one embodiment of present invention in a horizontal orientation.
Figure 3:
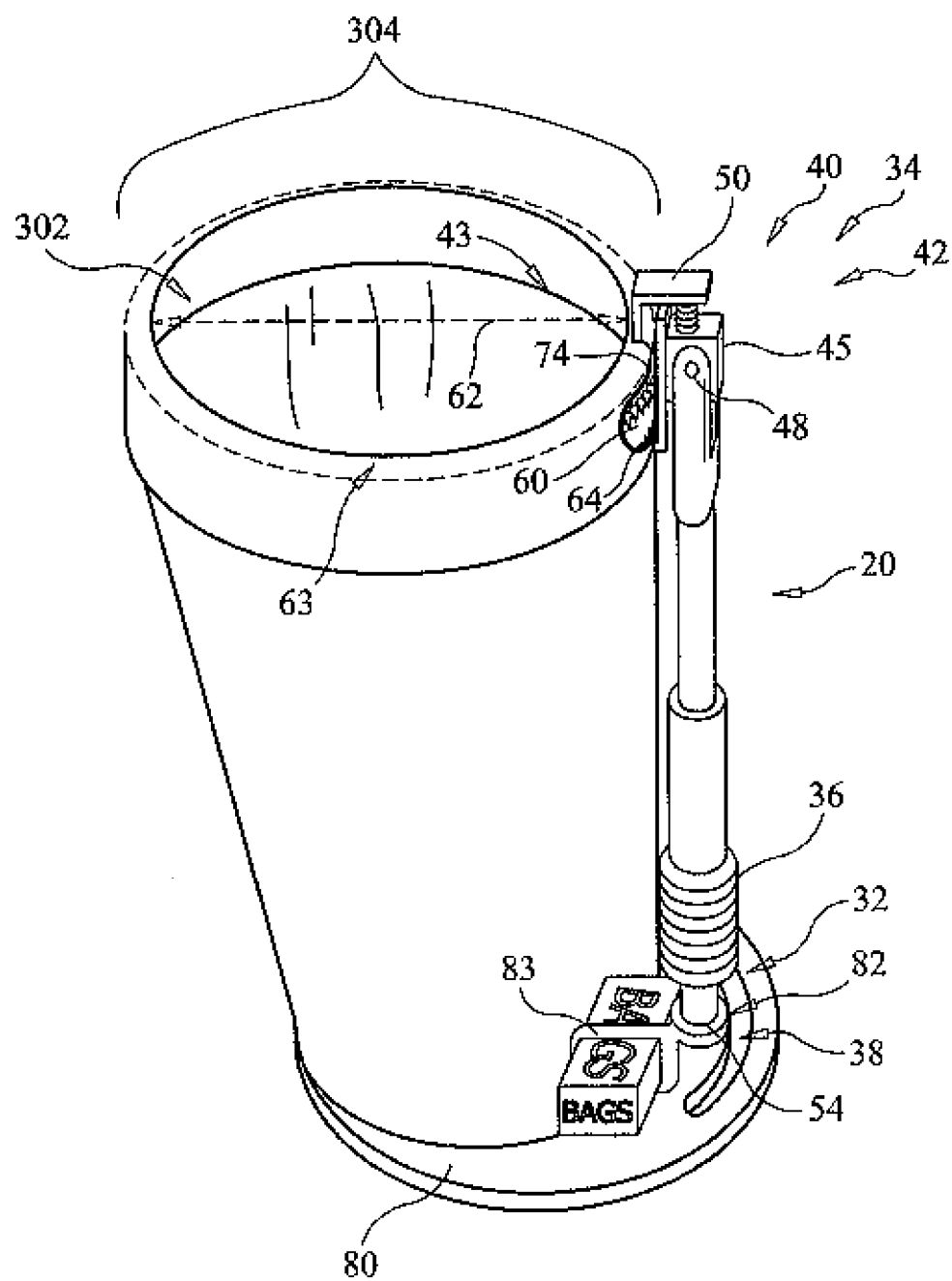
FIG. 3 is a perspective view of one embodiment of the present invention in a vertical orientation.
Figure 4:
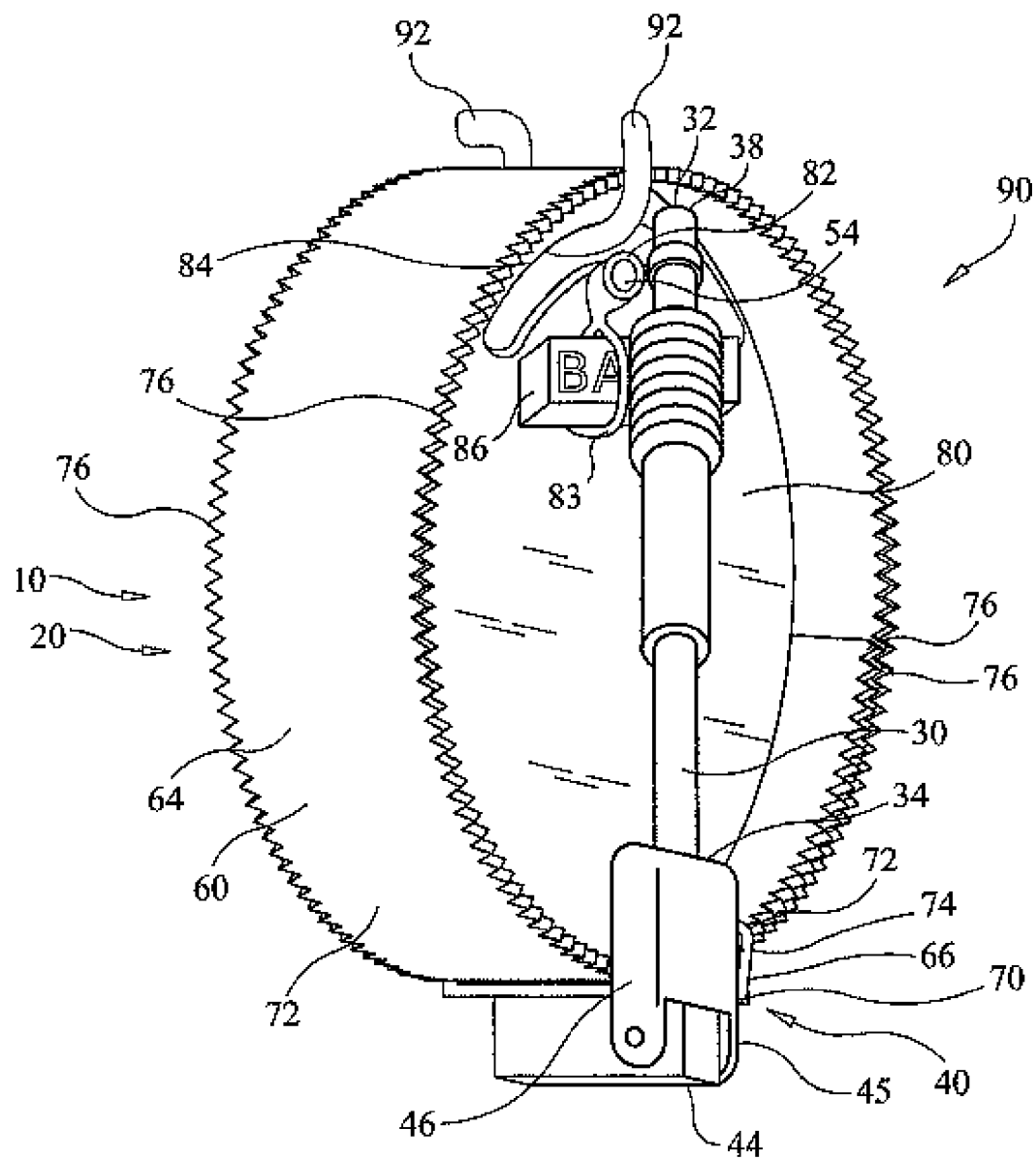
FIG. 4 is a perspective view of one embodiment of the present invention shown in stored compact state.
Figure 5:
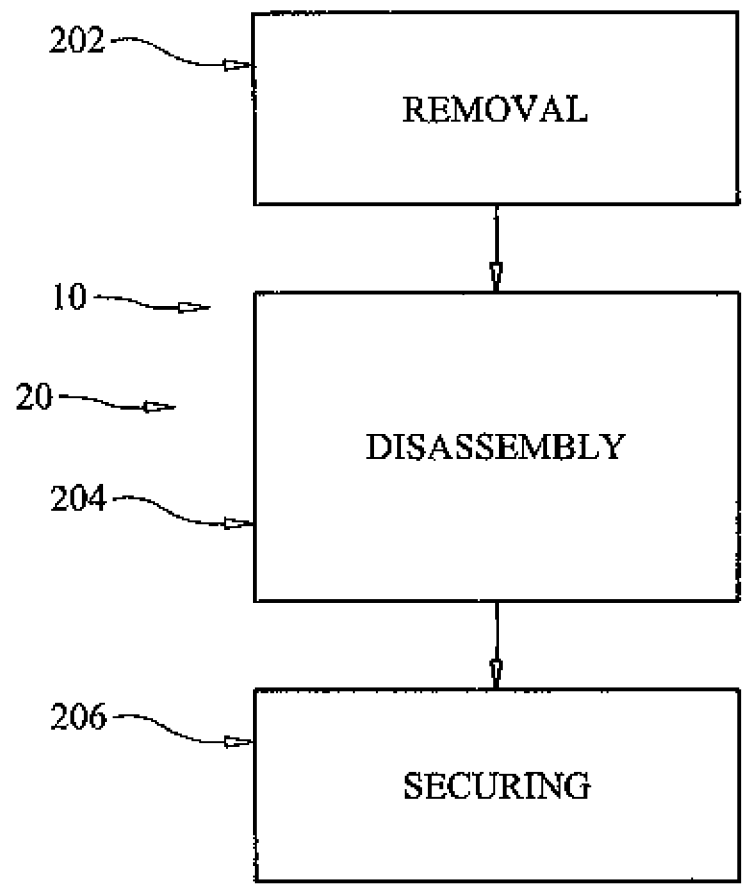
FIG. 5 is a flow chart demonstrating at least one process for operating the invention.

The invention will now be described with reference to the accompanying drawings.

One embodiment of the bag holder and support device 10 of the present invention comprises a bag holder 20. The bag holder 20 comprises hoop 60, a telescopic handle 30 and a base 80. The hoop 60 comprises a strip 64 made of resilient material having a length and width and two strip ends. The hoop 60 has an adjustable diameter 62 or circumference 63 when a first strip end is looped relative to a portion of the strip 64 and is adjustably held in place by a catch mechanism 70. The catch mechanism 70 may be of different types, such as a loop 72 through which is movably passed the second strip end 68. Once so inserted, the respective strip ends 66 and 68 can be moved relative to one another to either reduce or increase the size of the diameter 62 or circumference 63 of the hoop 60.

In one embodiment, the loop 72 may have canted sides. The loop 72 may be wider or canted outward where it attaches to the first strip end 66 and narrower or canted inward at the end that is not attached to the first strip end. In this manner, the natural tendency of the hoop 60 to straighten may cause a portion of the inserted strip 64 passing through the loop 72 to press up and against the narrow section of the loop 72 formed by its canted sides 74. The normal resiliency of the strip 64 may cause serrated edges 76 to engage the sides 74 of the loop 72 to generally prevent the change in diameter 62 of the hoop 60 until the operator makes a change thereto.

The serrated edge 76 may impart to the hoop 60 an enhanced bag holding capability to generally prevent the weight of materials placed into the trash bag 300 from pulling the trash bag 300 off of the hoop 60. The serrated edge 76 engages the trash bag near the open-mouth 302 of the trash bag 300.

The hoop 60 may be constructed to allow its diameter to be adjusted to hold trash bags 300 whose open-mouth portions 302 have a wide variety of circumferences 304.

The bag 300 may comprise a wide variety of bags, such as garbage bags, lawn bags, construction bags and the like. The bags 300 may have a fixed maximum circumference at their open-mouth portions 302, or they may be of the drawstring variety of bags with an adjustable open mouth circumference.

The telescopic handle 30 of the present embodiment may have two handle ends 32 and 34. The first handle end 32 has a grip and a handle attachment point 38 that attaches to a base attachment point 82 on the base 80. The second handle end 34 is pivotally attached to a hoop attachment device 40 that can grip the hoop 60. The hoop attachment device 40 comprises a pivot attachment 42 and a clasp 43. The pivot attachment 42 has a male portion 44 and female portion 45, the female portion 45 being attached to the telescopic handle, and connected to male base 47 of the male portion 44. An axle 48 pivotably connects the male portion 44 to the female portion 45 to allow the male portion 44 to pivot about the axle 48. The clasp portion of the hoop attachment point 40 may also reversibly or releasably fix the hoop 60 at the desired circumference 63.

The male portion 44 can be further connected to the clasp 43. The clasp 43 could comprise a first, L-shaped clamp and a second, spring biased, L-shaped clamp 50 connected to the male portion 44 and a spring-loaded, inverted L-shape clamp 50 movably connected to the male portion 44. A spring 51 biases the second L-shaped clamp 50 towards the fixed L-shaped clamp 49. The fixed L-shaped clamp 49 may have a groove 52 wide enough to receive an edge 66 of the strip 64. The biasing of the fixed and movable clamps 49 and 50 towards one another may be sufficient to create a space between the two clamps 49 and 50. A portion of the hoop 60 may be releasably held by the two clamps 49 and 50.

The first handle end 32 may have a suitable grip 36. The handle attachment point 38 may be an opening 54 at the tip of the first handle end 32 which is held within the base attachment point 82. The telescopic handle 30 is configured to allow its length to be adjusted for bags 300 having a variety of lengths.

The base 80 may be made of any suitable material, and be formed into a disk-shape with the base attachment point 82 located at an edge of the base 80. The base 80 preferably has sufficient diameter and weight to be stable, and hold the bag in the desired orientation with the weight of materials therein. The trash in the bag may also hold up at least partially the bag.

The base 80 has a cutout 84, a base attachment point 82, and a lanyard 83, in one embodiment. The cutout 84 may allow a user to comfortably grasp the base 80 for transport, and be shaped to allow partial passage of a wall-mounted hook so that it can be hung on a wall 90.

The base attachment point 82 is preferably designed to be releasably received in the concave opening 54 in a friction fit relationship. A loop 87 of the lanyard may hold a trash bag container 86 for ease of replenishing the trash bag 300.

The strip 64 may have along its longitudinal axis of its inner side a channel 78 to receive an edge of the base 80 when the base 80 is placed with the hoop 60 for storage. The diameter 62 of the hoop 60 is adjusted to close the channel 78 on the edge of the base 80 to retain the base 80 within the hoop 60.

The bag holder of the invention 10 may be used in at least two operating modes and at least one storage mode. The operating modes could comprise: (a) a horizontal operating mode, without the base, to hold the open portion of the bag near the ground, and (b) a vertical operating mode, using the base, to hold the open mouth portion upright and generally away from the ground. The trash in the bag may also contribute toward keeping the bag upright, and this may even avoid the need for the base. In both operating modes, the operator selects the bag, based on bag length, open mouth portion dimensions, and other factors. The operator places the top portion of the bag through the interior of the hoop and drapes the top portion over the outer circumference of the hoop. The diameter of the hoop is then adjusted by moving the strip ends of the hoop closer or away from one another so that the desired circumference of the hoop closely matches the circumference of open mouth portion of the bag to hold the bag on the hoop and to hold the bag open. The roughened edge of the strip can releasably engage the bag to resist the force exerted by the weight of any material in the bag that may cause the bag to slip off the hoop during operation.

The operator can manipulate the clasp (for example, open the L-shaped clamps far enough) to receive the hoop. The operator may allow the biasing mechanism of the clasp to clamp upon the hoop to lock it and attach the hoop to the handle.

In the horizontal operating mode, the operator may adjust the handle length and pivot the clasp to place the telescopic handle suitably relative to the ground to allow the operator to comfortably hold the bag with its open month proximate to the ground with one hand. In the other hand, the operator may operate a suitable collection implement, such as broom, brush, rake, shovel, to collect material or objects on the ground and to drive such collected material into the open mouth portion of the bag. The operator, using the handle, can press down on the hoop so that the bottom portion of the hoop can contact the ground to generally deform the hoop into an oval or other shape. The bottom portion of the hoop will have greater conformity with the surface of the ground to make it easier to brush in material from the ground into the trash bag.

In the vertical operating mode, the operator may attach the telescopic handle to the base, adjust the telescopic handle length to the length of the bag after the bag has been attached to the hoop, pivot the clasp to place the hoop generally parallel to the base so the trash bag is generally vertical with the mouth of the trash bag generally away from the ground, and loop the lanyard to hold one or more trash bag containers. The bag holder can be adjusted to hold a variety of trash bags in a generally upright position in areas from underneath a sink to the garage to outdoors to the bedroom closet. In another embodiment, the contents of the bag may give it form and structure sufficient to keep the bag more or less upright without using the base.

For storage, the operator may compact and store the device by removal of the trash bag from the hoop, and then proceed to disassembly. The operator disconnects the base from the telescopic handle, and manipulates and pivots the clasp to place the telescopic handle over the hoop. The operator then places the hoop within the interior of the base and adjusts the hoop to have the desired circumference for a snug fit. Containers of trash bags may be placed within and be held by an elastic lanyard with the hoop interior proximate to the base. In this manner, the device and bag supply is compacted into a generally flat storage arrangement.

Figure 6:
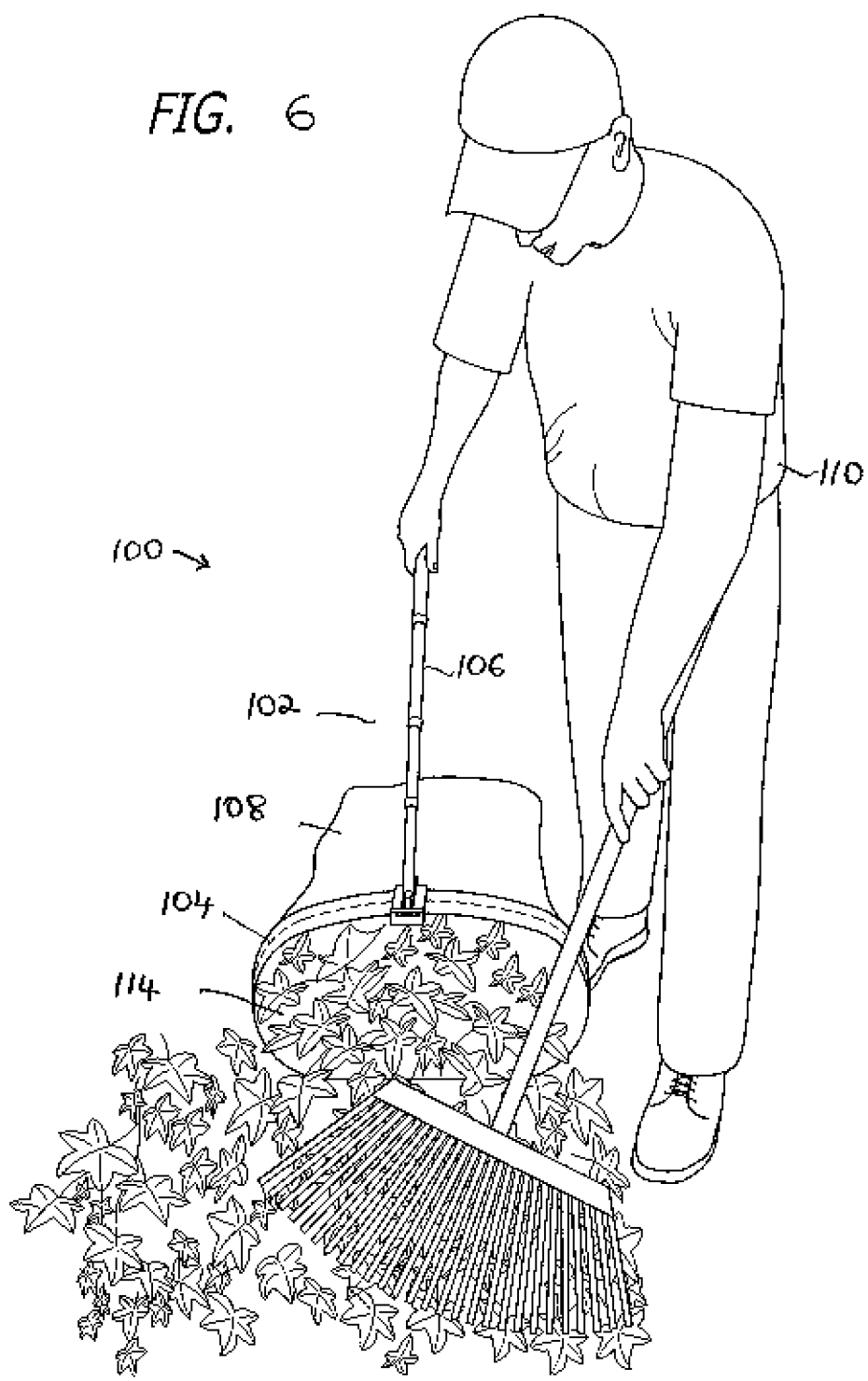
FIG. 6 is a perspective view of a bag holder in accordance with a further embodiment of the invention, showing a user sweeping up leaves into the bag.

Reference is now made to FIGS. 6 to 14 of the drawings, which show further embodiments of the invention. In FIG. 6 of the drawings, there is shown a representation of the bag holder and support device 100 in accordance with the invention. Note that this figure does not show the base of the device 100, which will be illustrated and described in other figures. FIG. 6 shows a bag holder 102 comprising a hoop 104 and a handle 106. The handle 106 is releasably attached to the hoop 104 at a selected point on the circumference of the hoop 104. FIG. 6 also shows a bag 108 connected to the hoop 104. A user 110 manipulates the bag holder 102 by adjusting the position of the handle 106. An open mouth 114 of the bag 108 is presented and lies adjacent the ground or surface. The user is able to sweep leaves or other debris into the bag 108, as shown.

The hoop 104 in FIG. 6 of the drawings would normally be substantially circular in its rest position. However, the hoop 104 is preferably comprised of a flexible and resilient material which enables it to be bent or distended in the manner shown in FIG. 6 of the drawings, thereby increasing contact area with the ground.

Figure 7:
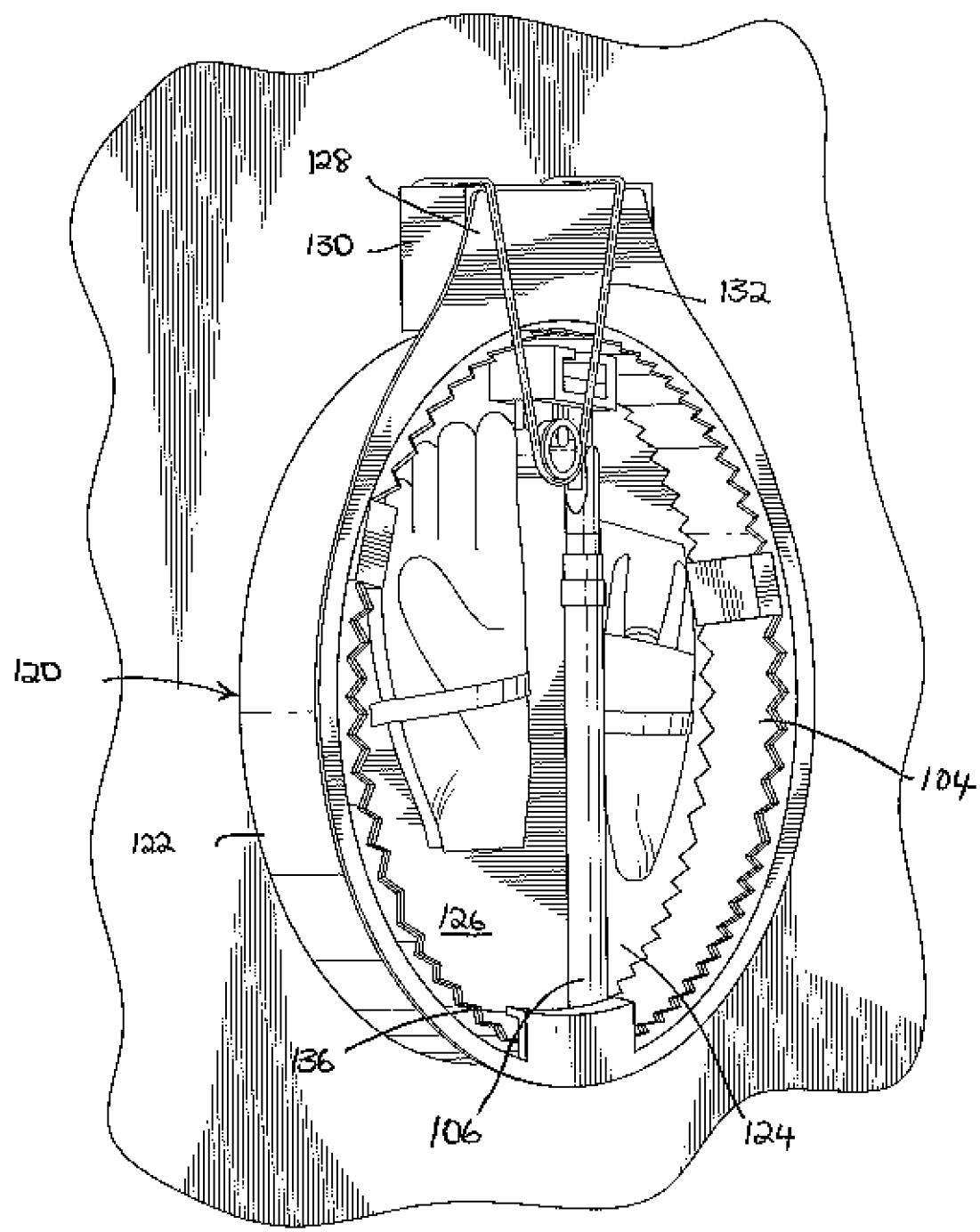
FIG. 7 is a perspective view of a bag holder and base of the present invention in a stored position.

With reference to FIG. 7 of the drawings, there is shown a bag holder and support device 100, configured in the stored or compacted position. The various components are illustrated, including the hoop 104, and the handle 106. These are stored in a base 120 which comprises a circular sidewall 122 and a base wall 124. These walls 122 and 124 define a storage space 126 for receiving the hoop 104, handle 106, and optional other objects such as cutters, gardening gloves, as needed. The base 120 further comprises a shelf or flange 128 upon which is selectively stored a bag container 130 for holding a plurality of bags, so that these are readily and conveniently available for the user. The bag container 130 is retained on the flange 128 by means of a cord 132, such as a stretchable bungee cord, which can be releasably tied to a post 134 on the base 120.

Figure 8:
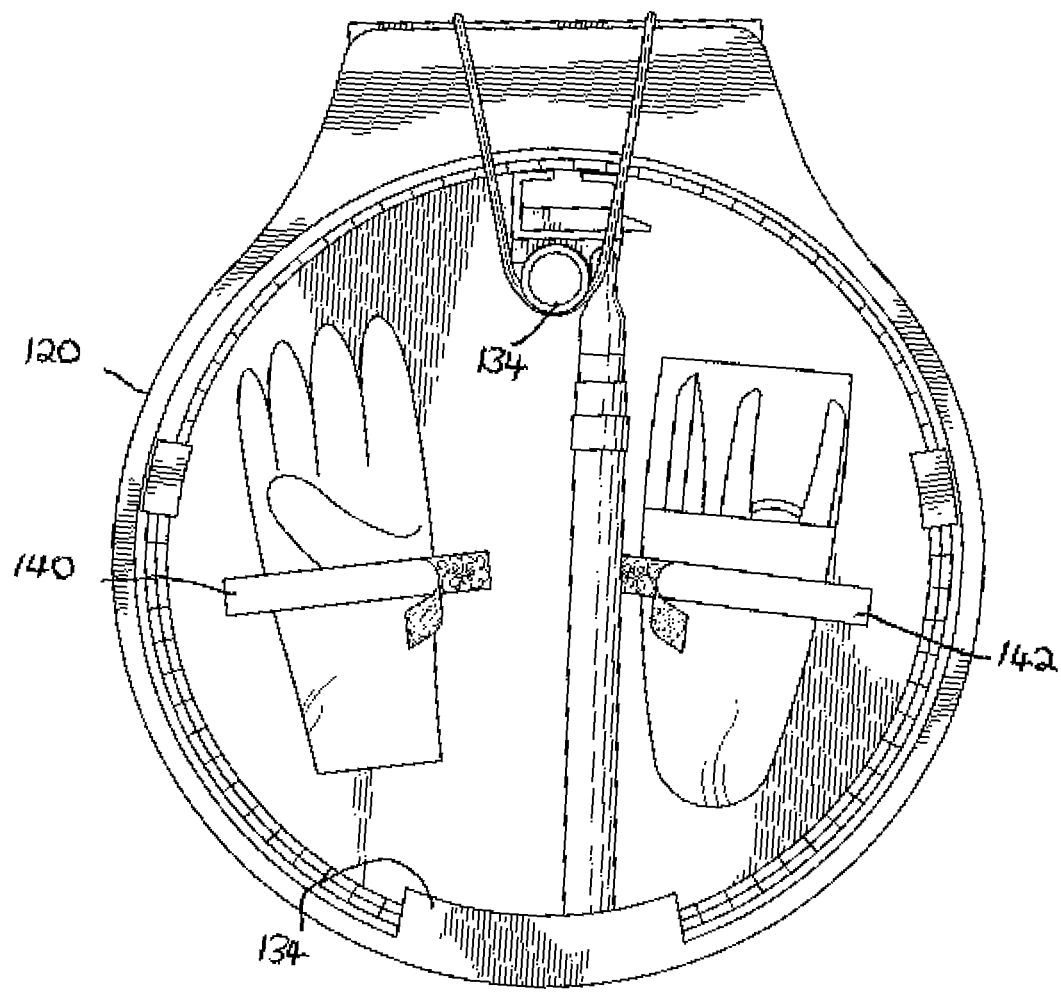
FIG. 8 is a bottom view of the bag holder and base of the present invention in a stored position.

FIG. 8 of the drawings shows a bottom view of the base 120 with it stored contents, substantially as illustrated in FIG. 7 of the drawings. It will be seen in this figure as well that the base 120 includes an overhang 134 on the side opposite that of the flange 128. The overhang 134 includes a lip 136, and in conjunction with the fastened cord 132 ensures that the hoop 104 and handle 106 do not fall out of the base 120. Velcro straps 140 and 142 are also provided for keeping other stored objects in the base 120.

FIGS. 9 and 10 of the drawings show detailed views of the hoop 104. FIG. 9 shows the hoop 104 in a contracted position and having a smaller diameter, while FIG. 10 shows a hoop 104 in a more expanded position and having a larger diameter. Note that FIGS. 9 and 10 show just two possible positions or configurations of the hoop 104. As will be described, the hoop 104 is fully adjustable so that it can be placed in configurations of any desired diameter. In this way, the hoop 104 can receive and hold a plastic bag of almost any size.

The hoop 104 is generally comprised of a resilient plastic material, such as polyethylene or polypropylene to name just two possibilities. The invention is not in any way limited by the nature of the material of which the hoop 104 is comprised. The hoop 104 may even be made of metal or cardboard, as long as it has the functions and structure as described herein.

The hoop 104 comprises an outer surface 146, an inner surface 148, an outside end 150, an inside end 152, an upper edge 154, and a lower edge 156. There is attached to the outside end 150 an opening loop 160. The opening loop 160 is fixed to the outside end 150, and includes a channel 162 through which the body of the hoop 104 passes, and through which the hoop 104 can freely slide. There is attached to the inside end 152 a closing loop 164. The closing loop 164 is fixed to the inside end 152, and includes a channel, also having reference 162, through which the body of the hoop 104 passes, and through which the hoop 104 can freely slide.

It will therefore be noted that the construction of the hoop 104 with the opening loop 160 and closing loop 164 at each of the respective ends 150 and 152 maintain the hoop 104 in a closed circular position. The circumference or diameter of the hoop 104 can easily be adjusted by moving the respective opening loop 160 and closing loop 164 slidably along the body of the hoop 104.

Conveniently, in order to close the hoop 104, or reduce its diameter, the user would hold the opening loop 160 with one hand, and, with the other hand, grasp the closing loop 164 and slide it along the length of the hoop 104 in the direction of the arrow 170. By pulling the closing loop 164 in this way, the inside end 152 is moved with the closing loop 164, and pulls the following portion of the hoop 104 along with it. Minimal resistance will be offered by the portions of the hoop 104 which are sliding over each other when the closing loop 164 is moved in this way. This is because the movement tends to move adjacent surfaces 146 and 148 of the hoop 104 away from each other, and not toward each other.

In order to open the hoop 104, a reverse action to that described above is followed. Thus, the user will hold the closing loop 164 in one hand, and move the opening loop 160 in the direction of the arrow 172. By pulling the opening loop 160 in this way, the outside end 150 is moved with the opening loop 160, and pushes the following portion of the hoop 104 along with it. Again, minimal resistance will be offered by the portions of the hoop 104 sliding over each other when the opening loop 164 is moved in this manner, because the movement tends to move adjacent surfaces 146 and 148 of the hoop 104 away from each other, and not toward each other.

In one embodiment of the invention, the opening loop 160 will be wholly or partially green to indicate to the user that this is the loop that must be moved to open or expand the circumference of the hoop 104. Further, the closing loop 164 will be wholly or partially red colored to indicate to the user that this is the loop that must be moved to close or contract the circumference of the hoop 104.

Figure 11:
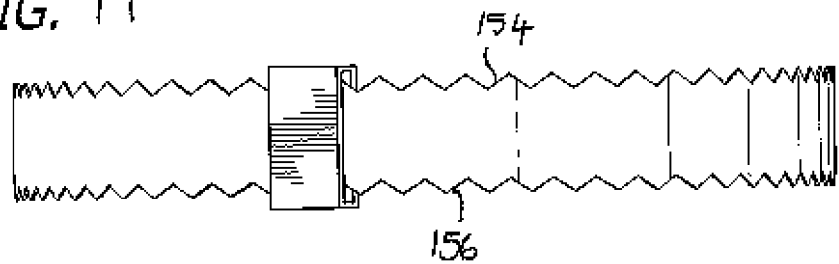
FIG. 11 is a side view of the bag holder hoop of the invention.

As shown in FIG. 11 of the drawings, the upper edge 154 of the hoop 104 has a series of peaks and valleys so as to have a zigzag configuration or nubs. The lower edge 156 of the hoop is similarly configured. In one form of the invention, the distance between two adjacent peaks or two adjacent valleys may be carefully selected. Further these nubs may be staggered on opposing edges 154 and 156 to provide additional strength to the hoop and help prevent plastic fatigue. The some or all of the nubs may also have rounded or somewhat blunted points at the peaks to prevent them from piercing or ripping a plastic bag. As will be described in further detail below, the hoop 104 will receive a plastic bag inside its circumference, with the edges of the open mouth of the plastic bag draped or folded over the hoop 104 adjacent the outside circumference thereof. The zigzag configuration, or series of nubs, engage the plastic bag so as to slightly stretch but not to rip it in order to ensure that the plastic bag stays on the hoop 104, and does not tear or slide even when loaded with material. These nubs are therefore appropriately staggered on both the upper and lower edges of the hoop to prevent plastic fatigue, and are designed to stretch the plastic bag at intervals, using the weight of the bag and the materials or contents thereof to keep the bag tautly over the nubs.

It is to be noted that the respective loops 160 and 164 do not lock against the body of the hoop 104, but are attached only at the two respective ends of the hoop 104. Therefore, they firmly hold the hoop 104 in its circumferential configuration, but at the same time allow overlapping portions of the hoop 104 to easily slide over each other to expand or contract the circumference of the hoop 104 so that the ideal size of the hoop can be achieved, according to the size of the plastic bag which it will hold.

In one embodiment of the invention, the hoop 104 may have calibrations or markings thereon to indicate the proper positions of the loops 160 and 164 for specific size plastic bags. For example, a 13 gallon or 33 gallon plastic bag of standard size will each require the hoop 104 to be a specific circumference, and the calibrations may be placed on the hoop 104 to indicate where the loops 160 and 164 should be positioned for optimal fitting of such plastic bags. These calibrations make it easy for the user to adjust the size of the hoop 104 to any size standard bags.

The width of the hoop 104 and the spacing or sizing of the nubs or zigzag configuration are selected in accordance with one aspect of the invention so as to ensure easy sliding or gliding of the hoop 104 in the loops 160 and 164 as its circumference increases or decreases by appropriate movement of the loops 160 and 164.

Figure 12:
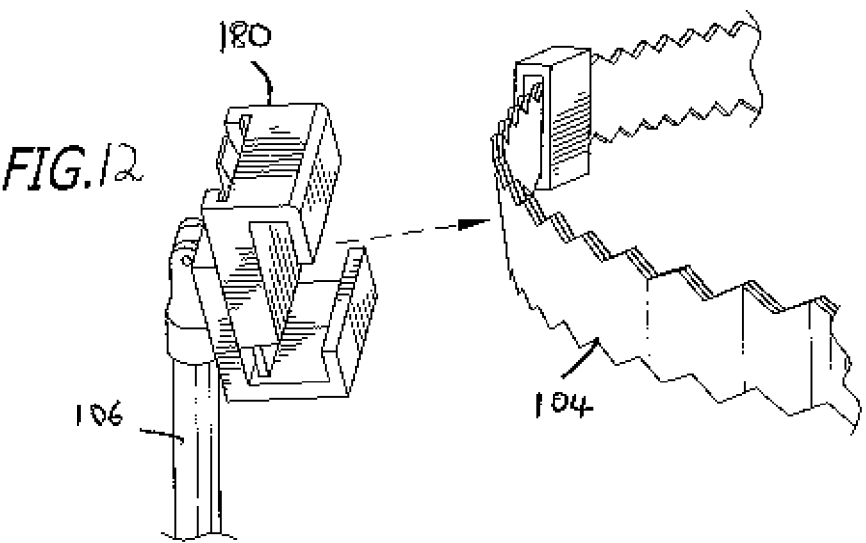
FIG. 12 is a detailed view showing the handle clamp and a part of the bag holder hoop in accordance with one aspect of the invention.

FIGS. 12 and 13 show the construction and operation of a handle and clamp in accordance with one aspect of the invention. It will be appreciated that many different types of clamps may be used for attaching the handle to the hoop 104, and the invention is not limited in this area.

FIG. 12 of the drawings shows a handle 106 having a clamp 180 attached at one end. Preferably, the handle 106 is of the extendable or telescoping type so that its length can be adjusted according to the needs of the job, and also compacted for storage purposes, as shown in FIGS. 7 and 8 of the drawings.

The clamp 180 has a fixed body portion 182 and a movable body portion 184. The fixed body portion 182 is fastened to a connector 186 at the end of the handle 106. The fixed body portion 182 and a connector 186 are held together by a pivot pin 188 which enables the fixed body portion 182 to rotate about the pin 188. The fixed body portion 182 includes a channel 190 and a snap fastener arm 192.

Figure 13A:
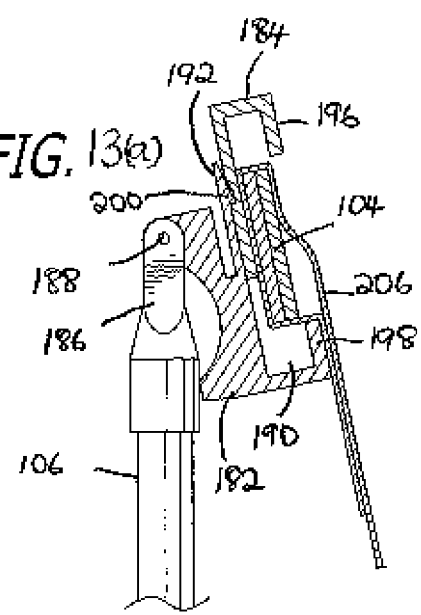
FIGS. 13(a) and 13(b) both show detailed sequential views of the handle clamp and its mechanism of attachment to the bag holder hoop.
Figure 13B:
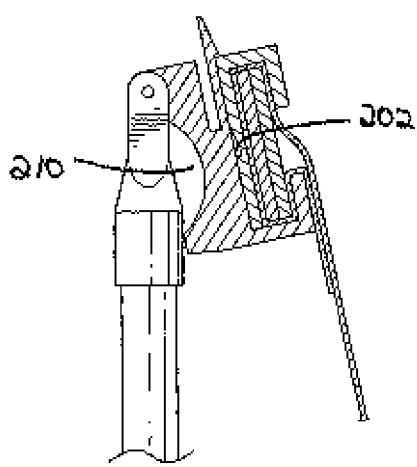

The movable body portion 184 is capable of moving up and down within the channel 190 between an unlocked position as shown in FIG. 13(a), and a locked position as shown in FIG. 13(b). When in the unlocked position, a selected portion of the hoop 104 can be received within the space defined between the fixed body portion 182 and the movable body portion 184. The movable body portion 184 includes a body flange 196, and the fixed body portion 182 includes a body flange 198, both of which cooperate to grasp or hold the hoop 104 in the channel 190 when the clamp 180 is locked.

The snap fastener arm 192 includes a small projection 200 which snaps into a small registering recess 202 in the movable body portion 184. When the projection 200 and recess 202 engage, the clamp 180 is in the unlocked position and further up and down movement of the movable body portion 184 is prevented. When the clamp 180 is in this unlocked position as shown in FIG. 13(a), a portion of the hoop 104 can be inserted into the clamp between the space defined by the body flange 196 and the body flange 198. It will be seen that in FIGS. 13(a) and 13(b), a bag 206 has already been placed around the hoop 104.

With the hoop 104 placed in the unlocked clamp 180, the clamp 180 is then moved from its unlocked position to the locked position by pushing down on the movable body portion 184. By so doing, the projection 200 on the snap fastener 192 will slide out of the recess 202, and the movable body portion 184 can be pushed down until it engages the base of the channel 190. At this point, the projection 200 snaps over the top of the movable body portion 184 to keep it in this locked position. At the same time, the body flange 196 and body flange 198 have moved closer to each other and surround a portion of the hoop 104, as shown in FIG. 13(b) to keep the hoop 104 fastened to the clamp 180.

The arrangement shown in FIGS. 13(a) and 13(b) illustrate the situation where the doubled over portion of the hoop 104 is engaged by the clamp 180. However, the invention is not limited to this arrangement, and the clamp 180 may engage even that portion of the hoop 104 which is not overlapped with another portion thereof, but consists of a single layer.

In order to release the hoop 104 from the locked clamp 180, the snap fastener arm 192 is pulled back slightly, such as by using the fingertip, which will allow the movable body portion 184 to slide upward relative to the fixed body portion 182 thereby allowing release of the hoop 104.

The fixed body portion 182 includes a circular cutout 210. The circular cutout 210 allows the handle 106 and clamp 180 to be stored in the base 120 as shown in FIG. 8 of the drawings, with the circular cutout 210 appropriately engaging with the post 134 to keep it stable in the base in the storage mode.

FIG. 14 of the drawings shows the bag holder device 100 in an assembled position. The base 120 is placed on a surface, and an open end of the handle 106 is placed on the post 134 to be supported thereby. The hoop 104 is attached to the handle by means of the clamp 180, and a bag 108 is placed on the hoop 104. Alternatively, the bag 108 is placed on the hoop prior to the hoop's attachment to the clamp 180. In this arrangement, the base 120 may have a wider footprint to help support the handle 106 and hoop 104, and the bag 106 on the hoop 104 with its mouth opened thereby can be used as a receptacle for materials such as garden discards.

The clamp has J shaped jaws with an opening and closing mechanism whose movement may be more or less parallel to the handle. A convenient release mechanism for locking and unlocking the clamp allows for easy use and operation with one hand. The fact that the clamp is hinged to the handle offers further convenience and versatility both for storage and operational purposes. Note that the hoop 104 can be used separately from the handle 106, to support and suspend a bag 108. If the handle 106 is attached to the hoop 104, the handle 106 can be attached to the base 120 as shown in FIG. 14, or it can be held by hand as shown in FIG. 6.

The one piece construction of the clamp avoids the possibility of lost parts and the space between the jaws is designed to firmly hold the hoop. With respect to the handle, this may extend or contract to the desired length based on the current needs. It has a durable construction and is designed to be stored in the base, as shown in the figures, with the clamp configured to go around the hole or post, or both of these, in the base. The base itself is capable of storing the hoop, handle, accessories as well as a box of plastic bags in storage. The hoop is stored inside the circular portion of the base, and its diameter can be expanded or contracted as necessary so as to fit snugly within the allotted space.

Many variations of the inventions can be made, and the invention is not limited to the precise details or components described herein.

The invention claimed is:

1. A hoop for holding a bag, the hoop comprising:
   a hoop strip having a first end, a second end and a central portion between the first end and the second end, the hoop strip being comprised of a resilient material and having an inside surface, an outside surface, an upper edge having a zigzag configuration along substantially the entire length thereof and a lower edge;
   a first loop member attached to the first end of the hoop strip, the first loop member defining a channel which receives slidably therein the central portion of the hoop strip;
   a second loop member attached to the second end of the hoop strip, the second loop member defining a channel which receives slidably therein the central portion of the loop strip, the first and second loop members maintaining the hoop strip in a generally circular rest configuration; and
   wherein the generally circular configuration of the hoop strip can be adjusted so as to have a plurality of circumferences by sliding the central portion of the hoop strip within the first loop member and second loop member.

2. A hoop as claimed in claim 1 wherein the lower edge of the hoop strip has a zigzag configuration.

3. A hoop as claimed in claim 1 wherein the channel of the first loop member has an outer portion and an inner portion, the outer portion being attached to the first end and the inner portion slidably receiving the central portion of the hoop.

4. A hoop as claimed in claim 1 wherein the channel of the second loop member has an outer portion and an inner portion, the inner portion being attached to the second end and the outer portion slidably receiving the central portion of the hoop.

5. A hoop as claimed in claim 1 further comprising a handle member for supporting the hoop strip, the handle member comprising an elongate handle and a clamp for releasably engaging the hoop strip.

6. A hoop as claimed in claim 5 wherein the clamp comprises a fixed body portion and a movable body portion, the fixed and movable body portions defining a receiving channel for accommodating a part of the hoop strip, the fixed and movable body portions being movable relative to each other between an unlocked position in which the hoop strip can be inserted in the receiving channel and a locked position in which the hoop strip is securely captured within the receiving channel.

7. A hoop as claimed in claim 6 wherein the fixed body portion comprises a snap fastener arm including a projection and the movable body portion includes a recess, the projection engaging the recess when the clamp is in the unlocked position, and the projection locking onto the body of the movable body portion in the locked position.

8. A hoop as claimed in claim 7 wherein the clamp is pivotally connected to the handle.

9. A hoop as claimed in claim 5 wherein the elongate handle is a telescoping handle which can move between an extended position and a retracted position.

10. A hoop as claimed in claim 1 further comprising a base member.

11. A hoop as claimed in claim 10 wherein the base member comprises a base wall and a side wall for defining a storage space.

12. A hoop as claimed in claim 11 wherein the storage space is substantially circular and receives therein the hoop strip, a handle, and other selected items.

13. A hoop as claimed in claim 10 wherein the base member has a connector for receiving and holding a handle in a substantially vertical orientation.

14. A hoop as claimed in claim 13 wherein the connector comprises a post for engaging the handle.

15. A hoop as claimed in claim 13 wherein the connector comprises a handle channel for receiving and engaging the handle.

16. A hoop as claimed in claim 10 wherein the base member comprises a surface for receiving and holding a container for bags.

17. A hoop as claimed in claim 1 wherein the hoop strip has attached thereto a plastic bag having an open mouth, the open mouth of the plastic bag being coincident with the circumference of the hoop strip.

18. A hoop as claimed in claim 1 wherein the hoop strip has attached thereto a plastic bag having an open mouth, the open mouth of the plastic bag being coincident with the circumference of the hoop strip, the plastic bag being folded over the upper edge of the hoop strip such that the zigzag configuration form a series of nubs which stretch and positively engage the plastic bag, the positive engagement increasing as the weight of the bag increases when material is added thereto.

19. A hoop as claimed in claim 18 wherein the nubs are rounded or blunted to reduce the possibility of ripping the plastic bag.

20. A bag holder comprising:
a hoop comprising a hoop strip with first and second ends and a central portion therebetween, loop members attached at each of the first and second ends respectively, each loop member having a channel for slidably receiving the central portion;
a handle member comprising a handle portion and a clamp, the clamp releasably holding the hoop; and
a base member having a storage area for storing the hoop and the handle member, the base member further comprising a connector for releasably holding the handle portion in a substantially vertical orientation.

21. A bag holder as claimed in claim 20 wherein the hoop strip is comprised of a resilient material and the loop members maintain the hoop strip in a generally circular shape when at rest.

22. A bag holder as claimed in claim 21 further comprising a plastic bag mounted on the hoop strip.

23. A bag holder as claimed in claim 22 wherein at least an upper edge of the hook strip comprises a series of spaced nubs or ridges to facilitate a more positive engagement between the plastic bag and the hook strip.

24. A method of bagging debris comprising:
forming a hoop of generally circular rest configuration for holding a bag, the hoop having a hoop strip with a first end and a first loop attached to the first end, a second end and a second loop attached to the second end, and a central portion between the first end and the second end, the hoop strip being comprised of a resilient material and having an inside surface, an outside surface, an upper edge with a zigzag configuration and a lower edge;
adjusting the generally circular configuration of the hoop strip so as to have a selected one of a plurality of circumferences by sliding the central portion of the hoop strip within the first loop member and second loop member;
placing a plastic bag with a body portion and an edge portion defining an open mouth on the hoop, the body portion of the bag being placed inside of the hoop against the inside surface thereof, and the edge portion being folded over the upper edge of the hoop to be at least partially engaged by the zigzag configuration and against the outer surface thereof.

25. A method as claimed in claim 24 further comprising the formation of contoured nubs on the zigzag configuration of the upper surface of the hoop to enhance positive engagement with the plastic bag.

26. A method as claimed in claim 25 further comprising attaching a handle to the hoop.

27. A method as claimed in claim 26 further comprising providing a base member and attaching the handle to the base member in either a substantially vertical operational position or in a stored position.

* * * * *